(12) United States Patent
Li et al.

(10) Patent No.: US 9,706,348 B2
(45) Date of Patent: Jul. 11, 2017

(54) SYSTEM AND METHOD FOR PROCESSING LOCATION DATA OF TARGET USER

(71) Applicant: TENCENT TECHNOLOGY (SHENZHEN) COMPANY LIMITED, Shenzhen, Guangdong (CN)

(72) Inventors: Yuhuang Li, Guangdong (CN); Peng He, Guangdong (CN); Yong Hu, Guangdong (CN); Chuan Chen, Guangdong (CN); Jing Nie, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/699,073

(22) Filed: Apr. 29, 2015

(65) Prior Publication Data

US 2015/0245173 A1    Aug. 27, 2015

Related U.S. Application Data

(63) Continuation of application No. PCT/CN2013/088542, filed on Dec. 4, 2013.

(30) Foreign Application Priority Data

Apr. 3, 2013  (CN) .......................... 2013 1 0115976

(51) Int. Cl.
    *H04W 4/00* (2009.01)
    *H04W 4/02* (2009.01)
    *H04W 64/00* (2009.01)

(52) U.S. Cl.
    CPC ............. *H04W 4/02* (2013.01); *H04W 4/021* (2013.01); *H04W 4/028* (2013.01); *H04W 4/025* (2013.01); *H04W 64/00* (2013.01)

(58) Field of Classification Search
    CPC ....... H04W 4/02; H04W 4/028; H04W 64/00; H04W 4/025; H04W 4/18; H04W 8/18;
    (Continued)

(56) References Cited

U.S. PATENT DOCUMENTS

2010/0041378 A1* 2/2010 Aceves ................ H04L 67/306
                                                     455/414.1
2013/0190004 A1* 7/2013 Papakipos ............ H04W 64/00
                                                     455/456.1

FOREIGN PATENT DOCUMENTS

CN       102047697 A    5/2011
CN       102946319 A    2/2013
(Continued)

OTHER PUBLICATIONS

Office Action issued in corresponding Chinese Application No. 201310115976.9, mailed on Dec. 2, 2014.
(Continued)

*Primary Examiner* — Olumide T Ajibade Akonai
(74) *Attorney, Agent, or Firm* — Anova Law Group, PLLC

(57) ABSTRACT

A method for processing location data of a target user includes obtaining a location data of the target user in a predetermined time range, to get a location data set, wherein a format of each location data in the location data set comprises at least two values, which are a location coordinate and a time value; determining the accumulation regions of the target user according to the location coordinate of each location data of the location data set; determining user behavior description information of the target user at the locations corresponding to each location data according to the determined accumulation region and the time value of each location data, wherein the user behavior description information includes a frequency of the target user appear- (Continued)

ing in the determined accumulation region under the different time status.

18 Claims, 5 Drawing Sheets

(58) Field of Classification Search
CPC .. H04W 4/206; H04W 4/185; G06Q 30/0267; G06Q 30/0261; H04M 3/42; H04M 1/72572; H04L 67/22; H04L 67/306
USPC .................... 455/414.1, 456.1–456.6
See application file for complete search history.

(56) References Cited

FOREIGN PATENT DOCUMENTS

| | | |
|---|---|---|
| CN | 103227821 A | 7/2013 |
| WO | WO2012018131 A | 2/2012 |

OTHER PUBLICATIONS

International Search Report issued in corresponding International Application No. PCT/CN2013/088542 mailed on Feb. 12, 2014.

\* cited by examiner

SYSTEM AND METHOD FOR PROCESSING LOCATION DATA OF TARGET USER

CROSS REFERENCE TO RELATED APPLICATIONS

The present application is a continuation application of PCT Patent Application No. PCT/CN2013/088542, filed on Dec. 4, 2013, which claims the benefit of priority to China patent application NO. 201310115976.9 filed in the Chinese Patent Office on Apr. 3, 2013 and entitled "SYSTEM AND METHOD FOR PROCESSING LOCATION DATA OF TARGET USER", the content of which is hereby incorporated by reference in its entirety.

FIELD OF THE TECHNICAL

The disclosure relates to computer application technology fields, and particularly to a system and method for processing location data of a target user.

BACKGROUND

The section provides background information related to the present disclosure which is not necessarily prior art.

The present information push technology can reduce the time of target users searching information on the Internet through automatically push information to target users. Specifically, the information push technology can search information according to the target users' interests, filter the searched information, and push the filtered information to the target user regularly. The information push technology helps the target users mining valuable information efficiently. At present, the more common information push technology is based on location data of the target users to push all kinds of information to the target users. The all kinds of information are about shopping, travel, hotels, and shopping mall near to the location of the target users.

Push servers can obtain the location data of the target users mostly through positioning technologies, such as base station positioning, wireless fidelity (wifi) hot spot positioning, global positioning system (GPS) positioning, and so on. The location data obtained through the existing ways mainly includes data of the target users' current location coordinate. However, servers cannot implement a service based on the target users' position according to the target users' behavior, only according to the location data obtained by the existing ways.

SUMMARY

The disclosed a system and system for processing location data of a target user are directed to solve one or more problems set forth above and other problems.

This section provides a general summary of the disclosure, and is not a comprehensive disclosure of its full scope or all of its features.

Further regions of applicability will become apparent from the description provided herein. The description and specific examples in this summary are intended for purposes of illustration only and are not intended to limit the scope of the present disclosure.

A method for processing location data of a target user, comprising:

obtaining a location data of a target user in a predetermined time range, to get a location data set, wherein a format of each location data in the location data set comprises at least two values, which are a location coordinate and a time value;

determining accumulation regions of the target user according to the location coordinate of each location data of the location data set;

determining user behavior description information of the target user at locations corresponding to each location data according to the accumulation regions and the time value of each location data, wherein the user behavior description information comprises a frequency of the target user appearing in the accumulation regions under different time status.

A device for processing location data of a target user, comprising:

an obtaining module configured to obtain a location data of the target user in a predetermined time range, to get a location data set, wherein a format of each location data in the location data set comprises at least two values, which are a location coordinate and a time value;

a determination module configured to determine accumulation regions of the target user according to the location coordinate of each location data of the location data set;

a processing module configured to determine user behavior description information of the target user at locations corresponding to each location data according to the accumulation regions and the time value of each location data, wherein the user behavior description information comprises a frequency of the target user appearing in the accumulation regions under the different time status.

A non-transitory computer readable storage medium, storing one or more programs for execution by one or more processors of a computer having a display, the one or more programs comprising instructions for:

obtaining a location data of a target user in a predetermined time range, to get a location data set, wherein a format of each location data in the location data set comprises at least two values, which are a location coordinate and a time value;

determining accumulation regions of the target user according to the location coordinate of each location data of the location data set;

determining user behavior description information of the target user at locations corresponding to each location data according to the accumulation regions and the time value of each location data, wherein the user behavior description information comprises a frequency of the target user appearing in the accumulation regions under the different time status.

BRIEF DESCRIPTION OF THE DRAWINGS

In order to illustrate the embodiments or existing technical solutions more clearly, a brief description of drawings that assists the description of embodiments of the invention or existing art will be provided below. It would be apparent that the drawings in the following description are only for some of the embodiments of the invention. A person having ordinary skills in the art will be able to obtain other drawings on the basis of these drawings without paying any creative work.

DETAILED DESCRIPTION OF ILLUSTRATED EMBODIMENTS

Technical solutions in embodiments of the present invention will be illustrated clearly and entirely with the aid of the drawings in the embodiments of the invention. It is apparent that the illustrated embodiments are only some embodiments of the invention instead of all of them. Other embodiments that a person having ordinary skills in the art obtains based on the illustrated embodiments of the invention without paying any creative work should all be within the protection scope sought by the present invention.

Figure 1:
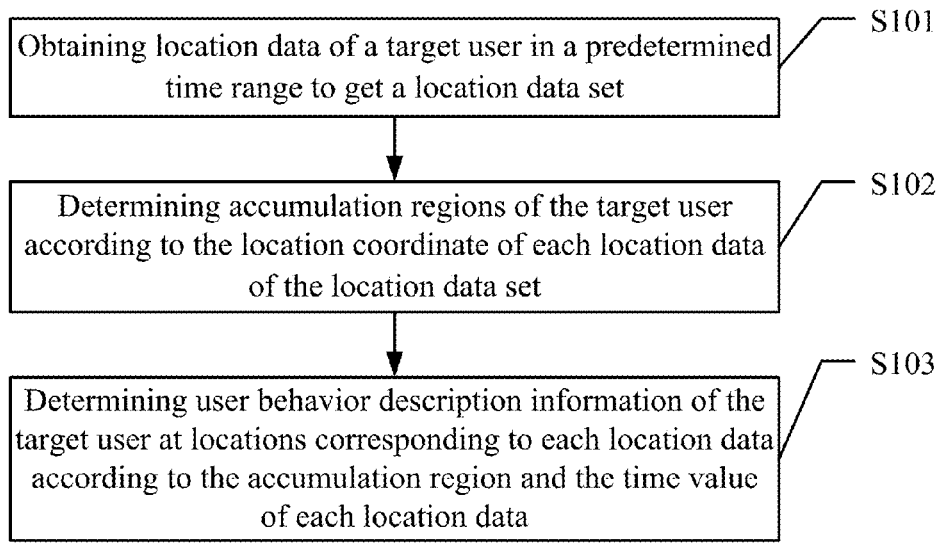
FIG. 1 is a flowchart of an example of a method for processing location data of a target user according to various embodiments.

Referring to FIG. 1, it is a flowchart of an example of a method for processing location data of a target user according to various embodiments. The method may be applied to all kinds of information push servers based on location based service (LBS), or applied to servers used for managing employees' work. In detail, the method includes the following steps.

Step S101: obtaining location data of a target user in a predetermined time range to get a location data set. A format of each location data in the location data set includes at least two values, which are a location coordinate and a time value.

Specifically, the target user's devices such as mobile terminals can be positioned in real time through adopting the positioning technologies such as GPS and base station positioning. The location data of the target user can be stored in the corresponding application servers such as instant messaging servers and social application servers used by the target user. When the timing reaches a threshold of the predetermined time range, an original location data of the target user in the predetermined time range can be obtained from all kinds of servers. The predetermined time range may be defined as a predetermined statistics period. For example, the location data of the target user at each time point of this month can be obtained. In detail, an hour may be used as a time unit, to obtain the location data of the target user at each hour of every day.

The format of each location data includes at least two values, which are the location coordinate and the time value. Specifically, the format of the location data may be defined as uin-lat-lng-time-type; wherein the uin denotes a number (target users' identifies, such as instant messaging account); the lat denotes the longitude and latitude (location coordinate); the lng denotes an accuracy; the time denotes as the time value; the type denotes as an business type.

After obtaining the location data of the target user, the obtained location data can be processed preliminary to get the location data set. The processing operation includes a first removing operation or/and a second removing operation. The first removing operation is used to remove the same information (such as the same location data). For example, some location data being at the same position and at the same time point or near to the time point can be removed according to the time value. The second removing operation is used to remove incomplete information (such as the incomplete location data). For example, the location data of which the location coordinate is incomplete or the time value is lost can be removed.

Step 102: determining accumulation regions of the target user according to the location coordinate of each location data of the location data set.

In the step 102, the accumulation region is determined according to the location coordinate of each location data. The determination principle for determining the accumulation regions is that a distance between every two location coordinates in the accumulation regions is in a predetermined range (such as in the range of the one kilometer distance), and the number of the location coordinate points in the accumulation regions is greater than a certain threshold (such as twenty). The step 102 may determine a plurality of accumulation regions. The plurality of accumulation regions may include a work accumulation region, a learning accumulation region, and a living accumulation region.

Step 103: determining user behavior description information of the target user at locations corresponding to each location data according to the determined accumulation region and the time value of each location data. The user behavior description information includes a frequency of the target user appearing in the determined accumulation region under the different time state.

According to a region which an office region of the target user is located, the accumulation regions which is in a predetermined region of the office region is used to be as the work accumulation region. The accumulation region which is in a predetermined region of a learning region is used to be as the learning accumulation region. The frequencies of the target user appears in the work accumulation region, the learning accumulation region, and the living accumulation region under the different time status are calculated according to the time value of the position date, to get the user behavior description information. The time status may include workdays and non-workdays. Besides, the time status may include the morning time from eight o'clock to twelve o'clock, the noon time from twelve o'clock to fourteen o'clock, afternoon time from fourteen o'clock to eighteen o'clock, and evening time.

For example, suppose the location data of the determined work accumulation region have two hundreds data, the location data corresponding to eight o'clock in the work accumulation region during the workdays have twenty data. Then the workday in the statistics period (such as this month) has twenty-two days. The frequency of the target user appearing in the work accumulation region at eight o'clock is $20/22*100\%=91\%$. The user behavior description information of each location data corresponding to the target user who appears in the work accumulation region at eight o'clock in the morning is 91%. Further, if the non-workday in the statistics period has eight days, then, the frequency of the target user appearing in the work accumulation region at eight o'clock in the morning is ⅖*100%=25%.

In the embodiment, the accumulation regions can be determined on the basis of the original location data of the target user. The user behavior description information can be obtained quickly and accurately according to the determined accumulation regions, to realize services of the applications such as information push based on user' position according to user's behavior.

Figure 2:
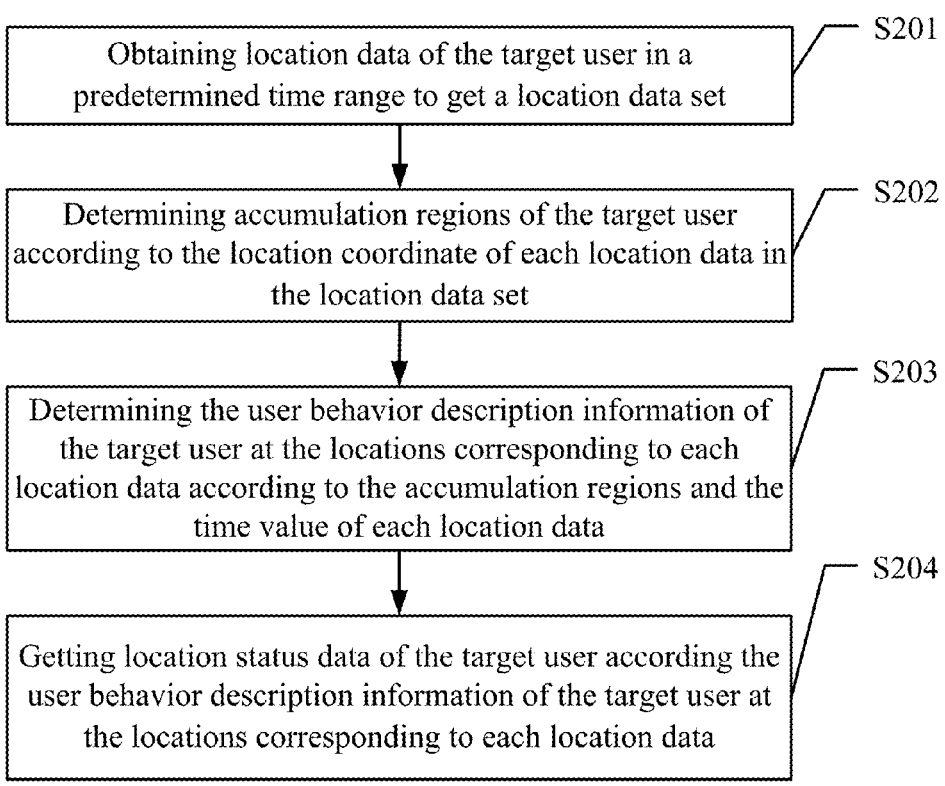
FIG. 2 is a flowchart of another example of a method for processing location data of a target user according to various embodiments.

Referring to FIG. 2, it is a flowchart of another example of a method for processing location data of the target user according to various embodiments. The method includes the following steps.

Step 201: obtaining location data of the target user in the predetermined time range to get a location data set. Wherein, the format of each location data in the location data set includes at least two values. The two values are the location coordinate and the occurrence time value.

Step 202: determining the accumulation regions of the target user according to the location coordinate of each location data in the location data set.

Step 203: determining the user behavior description information of the target user at locations corresponding to each location data according to the determined accumulation regions and the time value of each location data. The user behavior description information includes the frequencies of the target user appearing in the determined accumulation regions under the different time status.

Step 204: getting location status data of the target user according the determined user behavior description information of the target user at the locations corresponding to each location data. A format of the location status data includes at least three values. The three values include the location coordinate, the time value, and the user behavior description information.

The above-mentioned steps 201-204 are the same with the step 101-103 of the above-mentioned embodiment. The step 201-204 can be omitted here. In the step 204, the format of the location status data of the output each location data may be defined as uin、lat、lng、wt0_c、... 、wt23_c、nwt0_c、... 、nwt23_c (uin denotes the target user; the lat denotes the latitude; lng denotes the accuracy; wtn_c denotes the frequency (confidence) at n hour and in the workday time mode; nwtn_c denotes the frequency (confidence) at n hour in the non-workday time mode. According to the location data with the above-mentioned format, the target users' work status can be determined indirectly.

Figure 3:
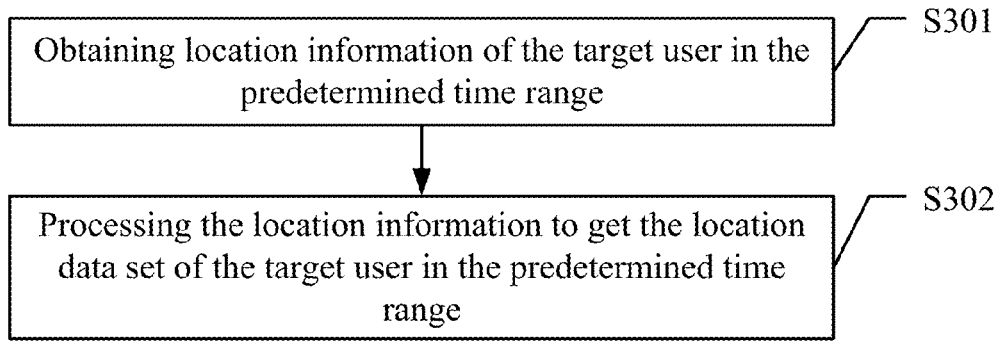
FIG. 3 is a flowchart of an example of a method for obtaining location data of a target user according to various embodiments.

Specifically, referring to FIG. 3, it is a flowchart of an example of a method for obtaining the location data of the target users according to various embodiments. The method corresponds to the steps 101 or 201. The method includes the following the steps.

Step 301: obtaining location information of the target user in the predetermined time range.

Step 302: processing the obtained location information to get the location data set of the target user in the predetermined time range. The processing operation includes the first removing operation and the second removing operation. The first removing operation is used to remove the same information (such as the same location data). The second removing operation is used to remove incomplete information (such as the incomplete location data).

The target user's original location data can be extracted through the business servers such as a mobile instant messaging, a mobile map, a mobile social network, and so on. For the trait of each original location data, setting the transformation logic, the format of the original location data is transformed into the data format of the cost system. The data format of the cost system is defined as uin-lat-lng-time-type (uin denotes the number; lat denotes the longitude and latitude; lng denotes the accuracy; time denotes the time value; type denotes the business type).

After finishing extracting and transforming the location data, owing to the location data of the target user are obtained from the different servers, the repetitive location data need to be removed according to the interval of the time value. For example, if two location data have the same location coordinate, and the interval between the time values of the two location data is one minutes, one of the two location data needs to be removed, and the other of the two location data is kept. During storing the location data in the server and transmitting the location data, the part of location data may be lost. Therefore, the incomplete location data needs to be removed. For example, if the location coordinate or the time value of the location data is lost, the incomplete location data needs to be removed. Therefore, the processed location data can be obtained.

Figure 4:
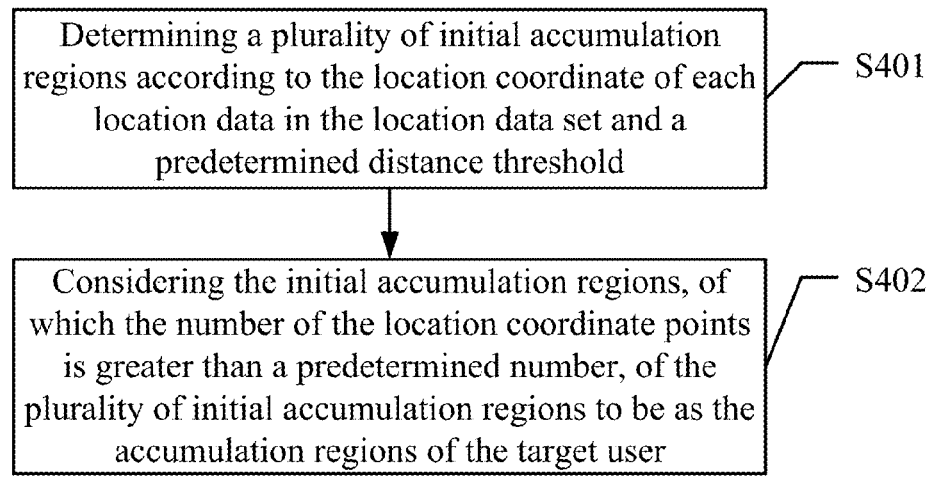
FIG. 4 is a flowchart of an example of a method for determining accumulation regions of a target user according to various embodiments.

Referring to FIG. 4, it is a flowchart of an example of a method for determining target users' accumulation region according to various embodiments. The method corresponds to the steps 102 or 202. The method includes the following steps.

Step 401: determining a plurality of initial accumulation regions according to the location coordinate of each location data in the location data set and a predetermined distance threshold.

Step 402: considering the initial accumulation regions, of which the number of the location coordinate points is greater than a predetermined number, of the plurality of initial accumulation regions to be as the accumulation regions of the target user.

Figure 5:
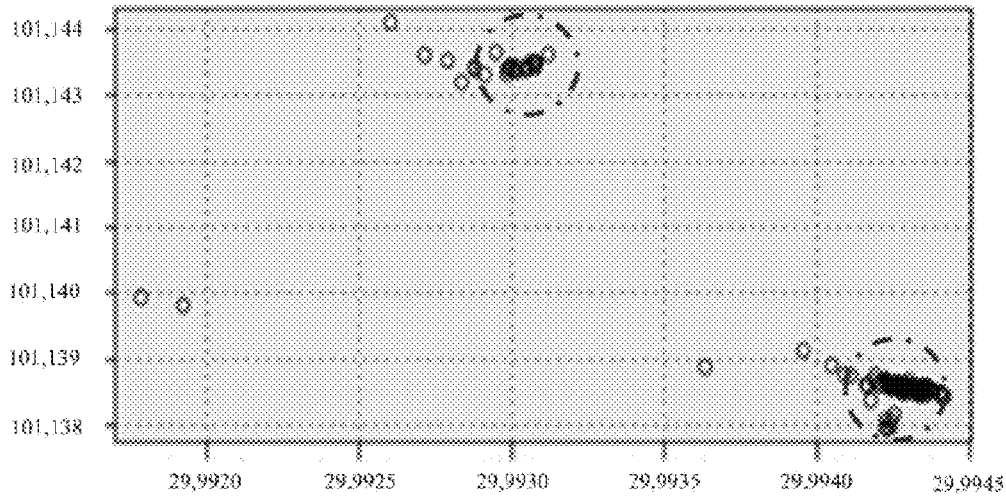
FIG. 5 is a typical drawing of determining accumulation regions of a target user.

Specifically, the target user's original location data (such as the location data in a month) can be aggregated to calculate the accumulation regions and expel scatters. The calculation rule may be that there is no coincide among the accumulation regions, the density of the accumulation region is greater than twenty (namely the number of the original position points is greater than twenty), and distances between each point and a center of the accumulation region is less than one kilometer. According to the calculation rule, the accumulation region with greater density can be obtained from the plurality of accumulation regions. For example, referring to FIG. 5, it is a typical drawing of determining target users' accumulation region. In the FIG. 5, X axis denotes the longitude. Y axis denotes the latitude. The FIG. 5 shows two determined accumulation regions. The two determined accumulation regions include the work accumulation region and the living accumulation region. The work accumulation region is located in the predetermined office region. The living accumulation region is located in the predetermined living region.

Figure 6:
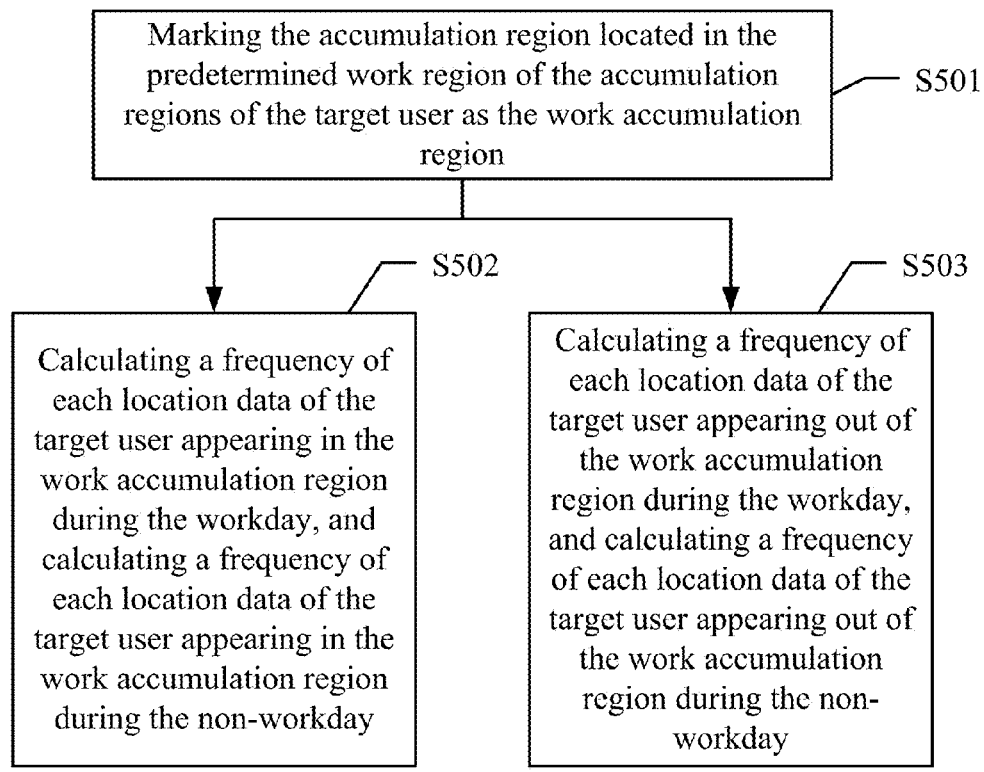
FIG. 6 is a flowchart of an example of a method for determining user behavior description information of a target user according to various embodiments.

Referring to FIG. 6, it is a flowchart of an example of a method for determining target users' user behavior description information according to various embodiments. The method corresponds to the steps 103 or 203. The method includes the following steps.

Step 501: marking an accumulation region located in the predetermined work region of the accumulation regions of the target user as the work accumulation region. Therefore, the work accumulation region can be obtained. The living accumulation region and the learning accumulation region can be obtained according to the same way.

Step 502: calculating the frequency of each location data of the target user appearing in the work accumulation region during the workday, and calculating the frequency of each location data of the target user appearing in the work accumulation region during the non-workday. That is, according to the time value of each location data in the work accumulation region, the frequencies of the target user appearing in the work accumulation region during the workday and non-workday can be determined.

Step 503: calculating the frequency of each location data of the target user appearing out of the work accumulation region during the workday, and calculating the frequency of each location data of the target user appearing out of the work accumulation region during the non-workday. That is, according to the time value of each location data in the work accumulation region, the frequencies of the target user appearing out of the work accumulation region during the workday and non-workday can be determined.

In the embodiment, the accumulation regions of the target user are divided into the work accumulation region and the non-work accumulation region to mark the location data of the target user, to record the target user's work status. In other embodiments, the accumulation regions of the target user can be further divided into the work accumulation region, the living accumulation region, the learning accumulation region, and so on to mark the location data of the target user, to realize counting up the status of the target user's work, living, and learning. The realization process is similar to the steps 501 to 503. That is, the living accumulation region and the learning accumulation region are obtained according to the target user's living region and learning region. Then, the location data of the corresponding accumulation region can be marked and counted up.

Specifically, the following table shows a time mode that a user is in the office region in November 2012. The workday is from Monday to Friday. The non-workday is weekend and legal holidays. The servers or devices for counting up the location data can distinguish the workday and non-workday according to the system time and the built-in calendar, and determine the total workday and the total non-workday this month.

The workday indicates that the users arrive at a company about at eight o'clock, go out of the company (may be for dinner) at twelve o'clock. Maybe 50% of the users come back the corresponding office of the company at thirteen o'clock, and go on to work at fourteen o'clock. Maybe 67% of the users go off duty at eighteen o'clock. Maybe 33% of the users work extra hours. It is can be seen from the workday mode, the users work extra time twice in November. The users work extra time for the first time from fifteen o'clock to eighteen o'clock. The users work extra time for the second time from fifteen o'clock to seventeen o'clock.

TABLE 1

| Workday mode | | Non-workday mode | |
| --- | --- | --- | --- |
| 0 | 0 | 0 | 0 |
| 1 | 0 | 1 | 0 |
| 2 | 0 | 2 | 0 |
| 3 | 0 | 3 | 0 |
| 4 | 0 | 4 | 0 |
| 5 | 0 | 5 | 0 |
| 6 | 0 | 6 | 0 |
| 7 | 0 | 7 | 0 |
| 8 | 20 | 8 | 0 |
| 9 | 21 | 9 | 0 |
| 10 | 22 | 10 | 0 |
| 11 | 22 | 11 | 0 |
| 12 | 3 | 12 | 0 |
| 13 | 10 | 13 | 0 |
| 14 | 22 | 14 | 0 |
| 15 | 21 | 15 | 2 |
| 16 | 22 | 16 | 2 |
| 17 | 21 | 17 | 1 |
| 18 | 8 | 18 | 0 |
| 19 | 1 | 19 | 0 |
| 20 | 3 | 20 | 0 |
| 21 | 2 | 21 | 0 |
| 22 | 0 | 22 | 0 |
| 23 | 0 | 23 | 0 |

The frequency of each location data of the target user appearing in the work accumulation region during the workday equals to the number of days of the users appearing at a certain time of the workday divided by the total number of workday in period. For example, the number of days of the user appearing on the office at eight o'clock of the workday is twenty. The total number of workday in this month equals to twenty two. The user's confidence at eight o'clock of the workday in the office is 90% ($=20/22$). Generally, the user's confidence is marked at percentage 91.

The frequency of each location data of the target user appearing in the work accumulation region during the non-workday equals to the number of days of the users appearing at a certain time of the workday divided by the total number of non-workday in period. For example, the number of days of the user appearing in the office at fifteen o'clock is two. The total number of non-workday in this month equals to eight. The user's confidence at fifteen o'clock of the non-workday in the office is 25% ($=2/8$). Generally, the user's confidence is marked at percentage 25.

Similarly, in the step 503, the frequency of each location data of the user appearing in the work accumulation region during the workday can be obtained through calculating. The frequency of each location data of the user appearing in the work accumulation region during the non-workday can be obtained through calculating.

After obtaining the above-mentioned location data, the obtained location data can be transmitted to the corresponding server to count up the users' work behavior. Through the interface protocol, the users' work behavior is detected once every month, and files with the location data of the target users obtained by processing are transmitted to the server system, and the file md5 is transmitted to the server system to be checked.

In the embodiment, the user behavior description information can be obtained quickly and accurately according to the user's accumulation region on the basis of the users' original location data. The users' behavior can be analyzed according the user behavior description information. Therefore, the service based on the user position can be realized according to the users' behavior. In addition, the obtained original location data can be processed to ensure that the following data can be analyzed quickly and accurately. The users' work status can be obtained through determining the users' work accumulation region, to facilitate companies to record the users' work status. The users' location data obtained at last is beneficial to analyze the following application according to the users' location data when the following applications are executed.

The device for processing location data of the target user of the embodiment is described in more detail below.

Figure 7:
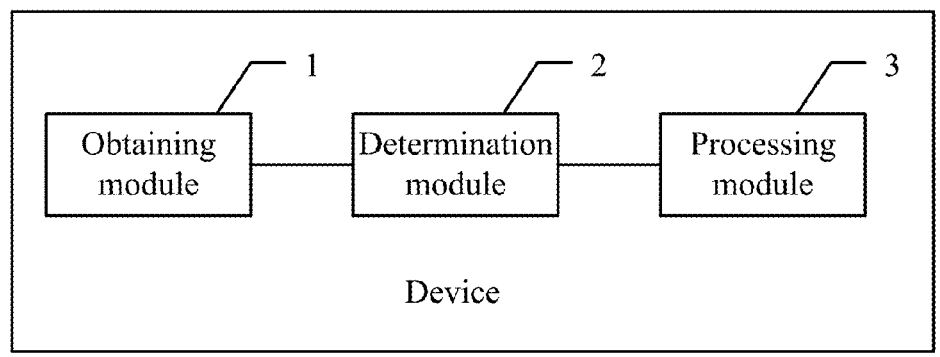
FIG. 7 is a block diagram of an example of a device for processing location data of a target user according to various embodiments.

Referring to FIG. 7, it is a block diagram of a device for processing location data of the target user according to various embodiments. The device of the embodiment may be applied to all kinds of information push servers or applied to servers used for managing employees' work. In detail, the device includes an obtaining module 1, a determination module 2, and a processing module 3.

The obtaining module 1 is used to obtain the location data of the target user in a predetermined time range to get a location data set. A format of each location data in the location data set includes at least two values, which are a location coordinate and a time value.

The determination module 2 is used to determine the accumulation regions of the target user according to the location coordinate of each location data of the location data set.

The processing module 3 is used to determine the user behavior description information of the target user at the locations corresponding to each location data, according to the determined accumulation region and the time value of each location data. The user behavior description information includes a frequency of the target user appearing in the determined accumulation region under the different time status.

Specifically, the target user's devices such as mobile terminals can be positioned in real time through adopting the positioning technologies such as GPS and base station positioning. The location data of the target user can be stored in the corresponding application servers such as instant messaging servers and social application servers used by the target user. When the timing reaches the threshold of the predetermined time range, the target user's original location data in the predetermined time range can be obtained from all kinds of servers. The predetermined time range may be defined as a predetermined statistics period. For example, the location data of the target user at each time point of this month can be obtained. In detail, an hour may be used as a time unit to count up to obtain the location data of the target user at each hour of every day.

The format of each location data includes at least two values, which are the location coordinate and the time value. Specifically, the format of the location data may be defined as uin-lat-lng-time-type; wherein the uin denotes a number (target users' identifies, such as instant messaging account); the lat denotes the longitude and latitude (location coordinate); the lng denotes an accuracy; the time denotes as the time value; the type denotes as an business type.

After obtaining the location data of the target user, the obtaining module 1 may process the obtained location data preliminary to get the location data set. The processing operation includes a first removing operation or/and a second removing operation. The first removing operation is used to remove the same information (such as the same location data). For example, some location data being at the same position and at the same time point or near to the time point can be removed according to the time value. The second removing operation is used to remove incomplete information (such as the incomplete location data). For example, the location data of which the location coordinate is incomplete or the time value is lost can be removed.

Specifically, the determination module 2 may determine the accumulation regions according to the location coordinate of each location data. The determination principle for determining the accumulation region is that a distance between every two location coordinates in the accumulation regions is in a predetermined range (such as in the range of the one kilometer distance), and the number of the location coordinate points in the accumulation regions is greater than a certain threshold (such as twenty). The step 102 may determine a plurality of accumulation regions. The plurality of accumulation regions may include the work accumulation region, the learning accumulation region, and the living accumulation region.

The processing module 3 may consider the accumulation region, which is in a predetermined region of the office region, as the work accumulation region, according to a region which the target user's office region is located. The accumulation region, which is in a predetermined region of the learning region, is considered as a learning accumulation region. The frequencies of the target user appears in the work accumulation region, the learning accumulation region, and the living accumulation region under the different time status are calculated according to the time value of the position date, to get the user behavior description information. The time status may include the workdays and the non-workdays. Besides, the time status may include the morning time from eight o'clock to twelve o'clock, the noon time from twelve o'clock to fourteen o'clock, afternoon time from fourteen o'clock to eighteen o'clock, and evening time.

For example, suppose the location data of the determined work accumulation region have two hundreds data, the location data corresponding to eight o'clock in the work accumulation region during the workdays have twenty data. Then the workday in the statistics period (such as this month) has twenty-two days. The frequency of the target user appearing in the work accumulation region at eight o'clock is $20/22*100\%=91\%$. The user behavior description information of each location data corresponding to the target user who appears in the work accumulation region at eight o'clock in the morning is 91%. Further, if the non-workday in the statistics period has eight days, then, the frequency of the target user appearing in the work accumulation region at eight o'clock in the morning is $2/8*100\%=25\%$.

In the embodiment, the users' accumulation regions can be determined on the basis of the user's original location data. The user behavior description information can be obtained quickly and accurately according to the determined accumulation regions, to realize services of the applications such as information push based on user' position according to user's behavior.

Figure 8:
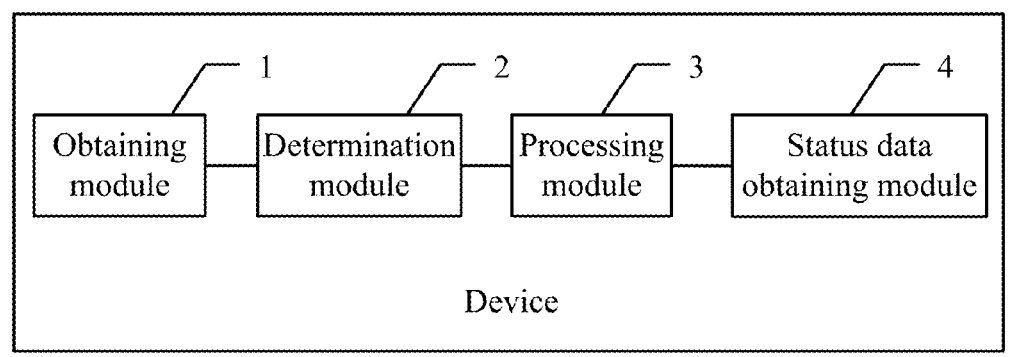
FIG. 8 is a block diagram of another example of a device for processing location data of a target user according to various embodiments, the device including an obtain module, a determination module, and a processing module.

Referring to FIG. 8, it is a block diagram of another example of a device for processing location data of the target user. The device includes the obtaining module 1, the determination module 2, and the processing module 3 of the embodiment corresponding to FIG. 7. In the embodiment, the device further includes a status data obtaining module 4. The status data obtaining module 4 is used to get location status data of the target user according the determined user behavior description information of the target user at the locations corresponding to each location data. A format of the location status data includes at least three values. The three values include the location coordinate, the time value, and user behavior description information.

The format of the location status data of the each location data output by the status data obtaining module 4 may be defined as $uin, lat, lng, wt0\_c, \ldots, wt23\_c, nwt0\_c, \ldots, nwt23\_c$ (uin denotes the target user; lat denotes the latitude; lng denotes the accuracy; wtn_c denotes the frequency (confidence) at n hour and in the workday time mode; nwtn_c denotes the frequency (confidence) at n hour in the non-workday time mode. According to the location data with the above-mentioned format, the target users' work status can be determined indirectly.

Figure 9:
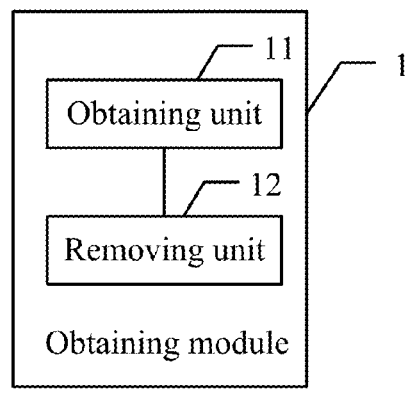
FIG. 9 is a block diagram of the obtain module of FIG. 8.

Further, referring to FIG. 9, it is a block diagram of the obtain module of FIG. 8. The obtaining module 1 includes an obtaining unit 11 and a removing unit.

The obtaining unit 11 is used to obtain location information of the target user in the predetermined time range.

The removing unit 12 is used to processing the obtained location information to get the location data set of the target user in the predetermined time range. The processing operation includes the first removing operation and the second removing operation. The first removing operation is used to remove the same information. The second removing operation is used to remove incomplete information.

The obtaining unit 11 may extract the t original location data of the target user through the business servers such as a mobile instant messaging, a mobile map, a mobile social network, and so on. For the trait of each original location data, setting the transformation logic, the format of the original location data is transformed into the data format of the cost system. The data format of the cost system is defined as uin-lat-lng-time-type (uin denotes the number; lat denotes the longitude and latitude; lng denotes the accuracy; time denotes the time value; type denotes the business type).

After finishing extracting and transforming the location data, owing to the location data of the target user are obtained from the different servers, the repetitive location data need to be removed according to the interval of the time value. For example, if two position date have the same location coordinate, and the interval between the time values of the two location data is one minutes, one of the two location data needs to be removed, and the other of the two location data is kept. During storing the location data in the server and transmitting the location data, the part of location data may be lost. Therefore, the incomplete location data needs to be removed. For example, if the location coordinate or the time value of the location data is lost, the incomplete location data needs to be removed. Therefore, the processed location data can be obtained.

Figure 10:
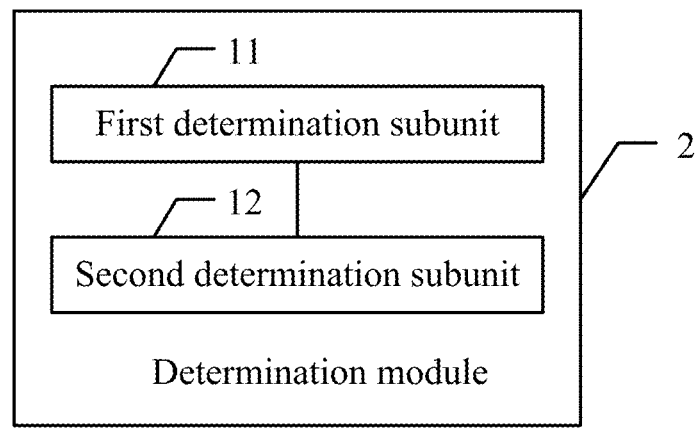
FIG. 10 is a block diagram of the determination module of FIG. 8.

Referring to FIG. 10, it is a block diagram of the obtain module of FIG. 8. The determination module 2 includes a first determination subunit 21 and a second determination subunit 22.

The first determination subunit 21 is used to determine a plurality of initial accumulation regions according to the location coordinate of each location data in the location data set and the predetermined distance threshold.

The second determination subunit 22 is used to consider the initial accumulation regions, of which the number of the location coordinate points is greater than a predetermined number, of the plurality of initial accumulation regions as the accumulation regions of the target user.

Specifically, the first determination subunit 21 can aggregate the target user's original location data (such as the location data in a month) to calculate the accumulation regions and expel scatters. The calculation rule of the second determination subunit 22 may be that there is no coincide among the accumulation regions, the density of the accumulation region is greater than twenty (namely the number of the original position points is greater than twenty), and distances between each point and a center of the accumulation region is less than one kilometer. According to the calculation rule, the accumulation region with greater density can be obtained from the plurality of accumulation regions. For example, referring to FIG. 5, it is a typical drawing of determining target users' accumulation region. In the FIG. 5, X axis denotes the longitude. Y axis denotes the latitude. The FIG. 5 shows two determined accumulation regions. The two determined accumulation regions include the work accumulation region and the living accumulation region. The work accumulation region is located in the predetermined office region. The living accumulation region is located in the predetermined living region.

Figure 11:
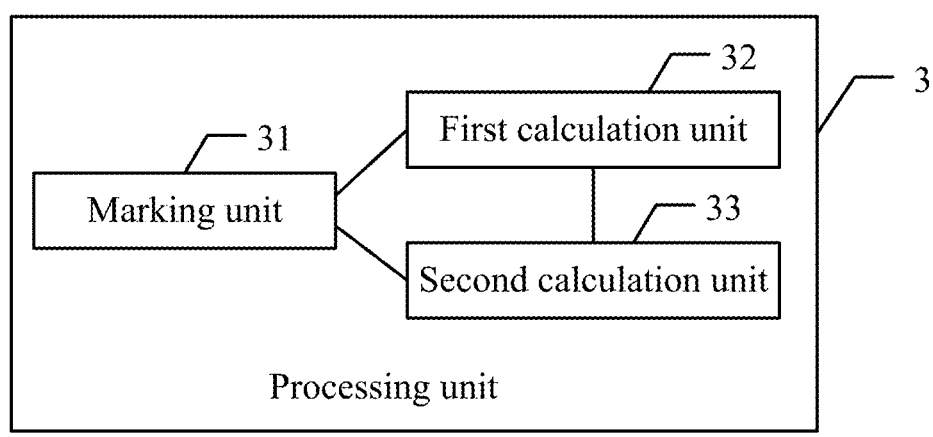
FIG. 11 is a block diagram of the processing module of FIG. 8.

Referring to FIG. 11, it is a block diagram of the obtain module of FIG. 8. The processing module 3 includes a marking unit 31, a first calculation unit 32, and a second calculation unit 33.

The marking unit 31 is used to mark the accumulation region located in the predetermined work region of the accumulation regions of the target user as the work accumulation region.

The first calculation unit 32 is used to calculate the frequency of each location data of the target user appearing in the work accumulation region during the workday, and calculate the frequency of each location data of the target user appearing in the work accumulation region during the non-workday.

The second calculation unit 33 is used to calculate the frequency of each location data of the target user appearing out of the work accumulation region during the workday, and calculate the frequency of each location data of the target user appearing out of the work accumulation region during the non-workday.

In the embodiment, the accumulation regions of the target user are divided into the work accumulation region and the non-work accumulation region to mark the location data of the target user, to record the target user's work status. In other embodiments, the accumulation regions of the target user can be further divided into the work accumulation region, the living accumulation region, the learning accumulation region, and so on to mark the location data of the target user, to realize counting up the status of the target user's work, living, and learning. Similarly, the living accumulation region and the learning accumulation region are obtained according to the target user's living region and learning region. Then, the location data of the corresponding accumulation region can be marked and counted up.

In the embodiment, the user behavior description information can be obtained quickly and accurately according to the user's accumulation region on the basis of the users' original location data. The users' behavior can be analyzed according the user behavior description information. Therefore, the service based on the user position can be realized according to the users' behavior. In addition, the obtained original location data can be processed to ensure that the following data can be analyzed quickly and accurately. The users' work status can be obtained through determining the users' work accumulation region, to facilitate companies to record the users' work status. The users' location data obtained at last is beneficial to analyze the following application according to the users' location data when the following applications are executed.

A person having ordinary skills in the art can realize that part or whole of the processes in the methods according to the above embodiments may be implemented by a computer program instructing relevant hardware. The program may be stored in a computer readable storage medium. When executed, the program may execute processes in the above-mentioned embodiments of methods. The storage medium may be a magnetic disk, an optical disk, a Read-Only Memory (ROM), a Random Access Memory (RAM), et al.

The above descriptions are some exemplary embodiments of the invention, and should not be regarded as limitation to the scope of related claims. A person having ordinary skills in a relevant technical field will be able to make improvements and modifications within the spirit of the principle of the invention. The improvements and modifications should also be incorporated in the scope of the claims attached below.

What is claimed is:

1. A method for processing location data of a target user, comprising:
   obtaining a location data of a target user in a predetermined time range, to get a location data set, wherein a format of each location data in the location data set comprises at least two values, which are a location coordinate and a time value;
   determining accumulation regions of the target user according to the location coordinate of each location data of the location data set;
   determining user behavior description information of the target user at locations corresponding to each location data according to the accumulation regions and the time value of each location data, wherein the user behavior description information comprises a frequency of the target user appearing in the accumulation regions under different time status,
   wherein determining the accumulation regions of the target user according to the location coordinate of each location data of the location data set, comprises:
   determining a plurality of initial accumulation regions according to the location coordinate of each location data in the location data set and a predetermined distance threshold, each initial accumulation region comprising a plurality of different location coordinate points, a distance between every two location coordinate points in the initial accumulation region being less than the predetermined distance threshold;
   considering the initial accumulation regions, of which the number of location coordinate points is greater than a predetermined number, of the plurality of initial accumulation regions to be as the accumulation regions of the target user.

2. The method according to claim 1, wherein obtaining location data of the target user in a predetermined time range, to get a location data set comprises:
   obtaining location information of the target user in the predetermined time range;
   processing the location information to get the location data set of the target user in the predetermined time range, wherein a processing operation for the location information comprises a first removing operation for removing the same information and a second removing operation for removing incomplete information.

3. The method according to claim 2, further comprising:
   getting location status data of the target user according to the user behavior description information of the target user at locations corresponding to the location data, wherein a format of the location status data comprises at least three values, which are the location coordinate, the time value, and the user behavior description information.

4. The method according to claim 2, wherein the first removing operation for removing the same information comprises:
   when two location data have a same location coordinate, and an interval between time values of the two location data is within a preset time duration, keeping one of the two location data.

5. The method according to claim 1, wherein determining user behavior description information of the target user at the locations corresponding to each location data according to the accumulation region and the time value of each location data, comprises:
   marking an accumulation region located in a predetermined work region of the accumulation regions of the target user as a work accumulation region;
   calculating a frequency of each location data of the target user appearing in the work accumulation region during the workday, and calculating a frequency of each location data of the target user appearing in the work accumulation region during the non-workday;
   calculating a frequency of each location data of the target user appearing out of the work accumulation region during the workday, and calculating a frequency of each location data of the target user appearing out of the work accumulation region during the non-workday.

6. The method according to claim 5, further comprising:
   getting location status data of the target user according to the user behavior description information of the target user at locations corresponding to the location data, wherein a format of the location status data comprises at least three values, which are the location coordinate, the time value, and the user behavior description information.

7. The method according to claim 1, wherein obtaining the location data of the target user in the predetermined time range further comprises:
   obtaining a first original location data of the target user from a first server;
   obtaining a second original location data of the target user from a second server; and
   combining the first original location data and the second original location data to obtain the location data of the target user in the predetermined time;
   wherein the first server and the second server are associated with two different applications used on a device of the target user.

8. The method according to claim 7, further comprising:
   getting location status data of the target user according to the user behavior description information of the target user at locations corresponding to the location data, wherein a format of the location status data comprises at least three values, which are the location coordinate, the time value, and the user behavior description information; and
   transmitting the location status data of the target user to the first server and the second server respectively.

9. The method according to claim 7, wherein combining the first original location data and the second original location data further comprises:
   transforming a data format of the first original location data and a data format the second original location data into the format for the location data set; and
   combining the transformed first original location data and the transformed second original location data to obtain the location data of the target user in the predetermined time.

10. The method according to claim 7, wherein combining the first original location data and the second original location data to obtain the location data of the target user in the predetermined time further comprises:
    removing duplicated information included in both the first original location data and the original location data.

11. A device for processing location data of a target user, comprising:
    an obtaining module configured to obtain a location data of the target user in a predetermined time range, to get a location data set, wherein a format of each location data in the location data set comprises at least two values, which are a location coordinate and a time value;
a determination module configured to determine accumulation regions of the target user according to the location coordinate of each location data of the location data set;
a processing module configured to determine user behavior description information of the target user at locations corresponding to each location data according to the accumulation regions and the time value of each location data, wherein the user behavior description information comprises a frequency of the target user appearing in the accumulation regions under the different time status,
wherein the determination module comprises:
a first determination subunit configured to determine a plurality of initial accumulation regions according to the location coordinate of each location data in the location data set and a predetermined distance threshold, each initial accumulation region comprising a plurality of different location coordinate points, a distance between every two location coordinate points in the initial accumulation region being less than the predetermined distance threshold;
a second determination subunit configured to consider the initial accumulation regions, of which the number of the location coordinate points is greater than a predetermined number, of the plurality of initial accumulation regions to be as the accumulation regions of the target user.

12. The device according to claim 11, wherein the obtaining module comprises:
an obtaining unit configured to obtain location information of the target user in the predetermined time range;
a removing unit configured to processing the location information to get the location data set of the target user in the predetermined time range, wherein the processing operation includes the first removing operation to remove the same information and the second removing operation to remove incomplete information.

13. The device according to claim 12, further comprising:
a status data obtaining module configured to get location status data of the target user according the user behavior description information of the target user at locations corresponding to the location data, wherein a format of the location status data comprises at least three values, which are the location coordinate, the time value, and the user behavior description information.

14. The device according to claim 11, wherein the processing module comprises:
a marking unit configured to mark an accumulation region located in the predetermined work region of the accumulation regions of the target user as a work accumulation region;
a first calculation unit configured to calculate a frequency of each location data of the target user appearing in the work accumulation region during the workday, and calculate a frequency of each location data of the target user appearing in the work accumulation region during the non-workday;
a second calculation unit configured to calculate a frequency of each location data of the target user appearing out of the work accumulation region during the workday, and calculate a frequency of each location data of the target user appearing out of the work accumulation region during the non-workday.

15. The device according to claim 14, further comprising:
a status data obtaining module configured to get location status data of the target user according the user behavior description information of the target user at locations corresponding to the location data, wherein a format of the location status data comprises at least three values, which are the location coordinate, the time value, and the user behavior description information.

16. The device according to claim 11, wherein the obtaining module is further configured to:
obtain a first original location data of the target user from a first server;
obtain a second original location data of the target user from a second server; and
combine the first original location data and the second original location data to obtain the location data of the target user in the predetermined time;
wherein the first server and the second server are associated with two different applications used on a device of the target user.

17. The device according to claim 16, further comprising:
a status data obtaining module configured to get location status data of the target user according the user behavior description information of the target user at locations corresponding to the location data, wherein a format of the location status data comprises at least three values, which are the location coordinate, the time value, and the user behavior description information;
wherein the location status data of the target user is transmitted to the first server and the second server respectively.

18. A non-transitory computer readable storage medium, storing one or more programs for execution by one or more processors of a computer having a display, the one or more programs comprising instructions for:
obtaining a location data of a target user in a predetermined time range, to get a location data set, wherein a format of each location data in the location data set comprises at least two values, which are a location coordinate and a time value;
determining accumulation regions of the target user according to the location coordinate of each location data of the location data set;
determining user behavior description information of the target user at locations corresponding to each location data according to the accumulation regions and the time value of each location data, wherein the user behavior description information comprises a frequency of the target user appearing in the accumulation regions under the different time status,
wherein determining the accumulation regions of the target user according to the location coordinate of each location data of the location data set, comprises:
determining a plurality of initial accumulation regions according to the location coordinate of each location data in the location data set and a predetermined distance threshold, each initial accumulation region comprising a plurality of different location coordinate points, a distance between every two location coordinate points in the initial accumulation region being less than the predetermined distance threshold;
considering the initial accumulation regions, of which the number of location coordinate points is greater than a predetermined number, of the plurality of initial accumulation regions to be as the accumulation regions of the target user.

\* \* \* \* \*